March 25, 1952  M. N. FAIRBANK ET AL  2,590,165

BRIGHTNESS METER

Filed Nov. 5, 1948

INVENTORS
Merry N. Fairbank
and
Louis Rosenblum
BY
Donald L. Brown
and
Oliver H. Hayes
Attorneys Patented Mar. 25, 1952

2,590,165

UNITED STATES PATENT OFFICE 2,590,165

BRIGHTNESS METER

Murry N. Fairbank, Belmont, and Louis Rosenblum, Cambridge, Mass., assignors to Polaroid Corporation, Cambridge, Mass., a corporation of Delaware Application November 5, 1948, Serial No. 58,518

1 Claim. (Cl. 88—23)

This invention relates to brightness meters and more particularly to brightness meters especially adapted for use with cameras having a single control means for setting both the time that the shutter is open and the size of the diaphragm opening.

A principal object of the present invention is to provide such a meter giving direct readings which can be used, without interpolation, for setting the single control means in cameras of the above type.

Another object of the invention is to provide in such a brightness meter a novel movable scale which can be adjusted to give correct direct readings for photosensitive films of different sensitivity or to give correct direct readings for different light sources.

Still another object of the invention is to provide such a brightness meter whose movable scale can be readily and accurately adjusted without requiring the use of any tools.

Still another object of the invention is to provide a brightness meter which is simple to operate, which has a wide latitude of use and which can be cheaply and simply manufactured and assembled.

These and other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawing wherein.

Figures 1, 2, 3:
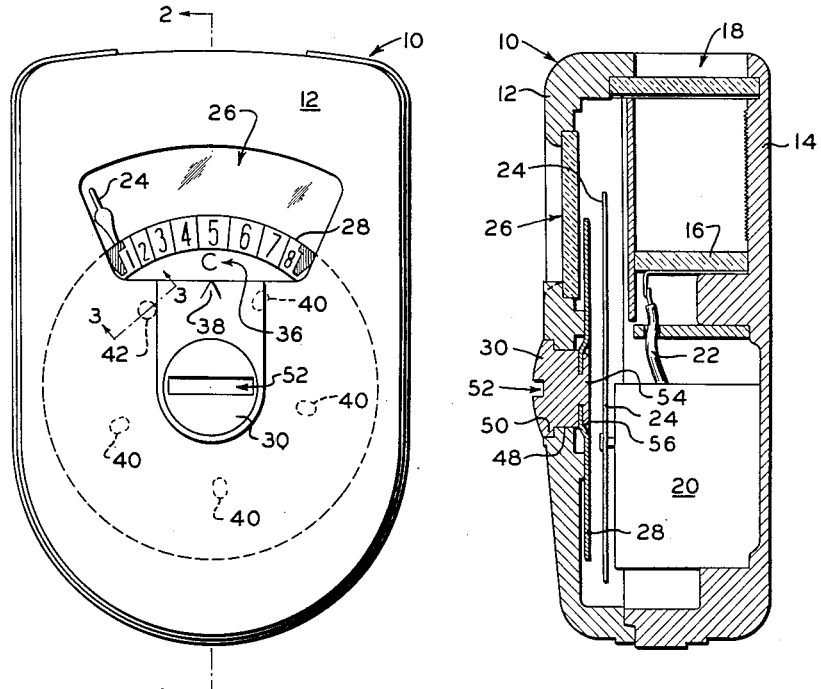
Figure 1 is a diagrammatic front view of a brightness meter embodying the present invention.
Fig. 2 is a diagrammatic sectional view of the brightness meter of Fig. 1 taken along the line 2—2.
Fig. 3 is an enlarged diagrammatic fragmentary sectional view of the brightness meter of Fig. 1 taken along the line 3—3.

In general this invention relates to brightness meters of the type comprising a housing having front and rear portions, and a photoelectric cell positioned to measure the intensity of light passing through an opening in the housing. A meter is electrically connected to the photoelectric cell and carries a pointer which may be viewed through an opening in the front housing portion. The front housing preferably supports, on the inner side thereof, a dial scale plate carrying a plurality of sets of scale markings to be read in conjunction with the meter pointer. The viewing opening is preferably just large enough to allow the viewing of only one set of scale markings at a time. Each set of scale markings includes an exposure index associated therewith and the front housing preferably carries a marker with which one of these indexes is aligned when its associated set of scale markings is to be used. This invention is primarily directed to the arrangement of this dial scale plate and the means for predeterminedly positioning the sets of scale markings with respect to the viewing opening.

Referring now to the drawings, wherein like numbers refer to like elements in all of the figures, the brightness meter is generally indicated at 10 as comprising a front housing portion 12 and a rear housing portion 14, these two housing portions being suitably secured together. Within the space defined by the two housing portions is a photoelectric cell 16 positioned so as to measure the intensity of light passing through an opening 18 in the end of the brightness meter. Also carried within the two housing portions is an electrical meter 20, connected by means of an electrical connection 22 to the photoelectric cell, so as to indicate variations in intensity of light striking the photoelectric cell. Meter 20 carries a pointer 24 which is so mounted that its movement may be viewed through a viewing opening 26 in the front housing 12. A dial scale plate 28 is preferably mounted on the inner side of the front housing so that a limited portion of the scale plate is viewable through the viewing opening 26. This dial scale plate is preferably supported by a rotatably mounted member 30 extending through the front housing.

Figure 4:
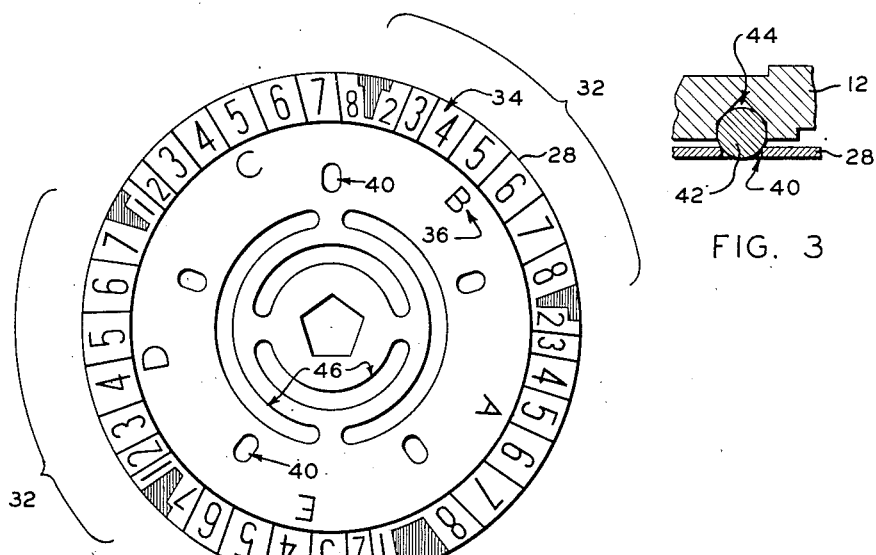
Fig. 4 is a diagrammatic plan view of the dial scale plate showing the preferred form thereof.

The preferred construction and making of the dial scale plate is shown in Fig. 4 wherein it can be seen that there are provided a plurality of sets 32 of scale markings 34. Associated with each set 32 is an exposure index 36. When one of the indexes 36 is aligned with a marker 38 (see Fig. 1) preferably carried by the front housing, its associated set of scale markings is positioned in front of the viewing opening 26 so as to be properly correlated with the brightness indicated by the pointer 24. For accurately positioning the dial scale plate, so that any one of the indexes 36 may be aligned with the marker 38 and held in the aligned position, there are provided a plurality of detent means, such as holes 40, formed in the dial scale plate. Each of these holes 40 is predeterminedly related to one of the indexes 36. For engaging the holes 40 there is provided a detent 42 preferably carried by the front housing in a depression 44, this detent 42 being shown in the preferred form as a ball (see Fig. 3). In order to increase the flexibility of the dial scale plate 28 there are provided a plurality of cut-away portions 46 near the axis thereof.

The rotatably mounted member 30, which carries the dial scale plate 28, preferably has a cylindrical body portion 48 and a shoulder 50. This member 30 is also preferably provided at its outer end with a notch 52, this notch being sufficiently large to receive a dime or penny. On the inner end of the rotatably mounted member 30 there is preferably provided a locking portion 54, comprising bent-over fingers 56, for securing the dial scale plate 28 to the member 30 to prevent rotation of either of these members with respect to the other. As can be seen best from Fig. 2, the shoulder 50 and the dial plate 28 prevent axial movement of the member 30.

In one preferred form of the invention the calibration of the various sets of scale markings is as set forth in the following tables:

in the outer end of member 30 and then turning the member 30 until the proper exposure index 36 appears in the viewing opening 26 and is aligned with the marker 38. This alignment is assisted by the detent 42 which enters the hole 40 corresponding to the desired index 36. The detent 42, when it enters the hole 40, maintains the dial scale plate 28 fixed against accidental dislodgement during use thereof. The brightness meter is now pointed to the object to be photographed, in accordance with usual practices recommended for use of brightness meters, and the pointer position is read to indicate directly the proper shutter and diaphragm setting numeral 34. When a different type of film or different illumination is employed (this difference being particularly important when an orthochromatic film is being exposed) the proper exposure index is selected by again inserting the edge of a coin in notch 52 and turning the member 30. As the member 30 starts to turn, carrying plate 28 therewith, the flexibility of plate 28 allows this plate to bend out of its normal plane so that the hole 40 is disengaged from the detent 42 and the unperforated portion of plate 28 passes over the detent until the next hole 40 is reached. If the next hole 40 does not correspond to the desired exposure index 36, turning is continued until the proper exposure index is reached and its corresponding hole 40

*Table 1*

| Exposure Index | Scale Calibration Brightness (Candles per square foot) | | | | | | | | | | | | | | |
|---|---|---|---|---|---|---|---|---|---|---|---|---|---|---|---|
| | 9 | 12 | 18 | 25 | 35 | 50 | 70 | 100 | 140 | 200 | 280 | 400 | 560 | 800 | 1120 | 1600 |
| A | | 2 | | 3 | | 4 | | 5 | | 6 | | 7 | | 8 | | |
| B | | | 2 | | 3 | | 4 | | 5 | | 6 | | 7 | | 8 | |
| C | | 1 | | 2 | | 3 | | 4 | | 5 | | 6 | | 7 | | 8 |
| D | | 1 | | 2 | | 3 | | 4 | | 5 | | 6 | | 7 | | |
| E | | | 1 | | 2 | | 3 | | 4 | | 5 | | 6 | | 7 | |

The above dial scale plate calibration is particularly designed for use with a shutter of the type described in the copending application of Murry N. Fairbank and Sidney B. Whittier, Serial No. 727,002, filed February 7, 1947 (now Patent No. 2,531,936, granted November 28, 1950). When such a shutter has eight shutter numbers it may be calibrated for the following f/no. and exposure time:

*Table 2*

| Shutter and Diaphragm Numerals (34) | f/no. | Exposure Time |
|---|---|---|
| 1 | f/11 | 1/8 sec. |
| 2 | f/11 | 1/15 sec. |
| 3 | f/11 | 1/30 sec. |
| 4 | f/11 | 1/60 sec. |
| 5 | f/16 | 1/60 sec. |
| 6 | f/22 | 1/60 sec. |
| 7 | f/32 | 1/60 sec. |
| 8 | f/44 | 1/60 sec. |

With a dial scale calibration of the type listed in Table 1 and a shutter and diaphragm calibration of the type listed in Table 2, the various exposure indexes (36) A, B, C, D and E correspond to photographic exposure indexes ("speeds") of 200, 140, 100, 70 and 50, respectively, as defined in ASA standard Z38.2.1 1947.

In the use of the invention, the camera operator first selects the proper exposure index 36 which is designated on the film to be exposed in the camera. This selection is made by inserting the edge of a coin, such as a dime, into the notch 52 is engaged by detent 42, thereby aligning the exposure index 36 with the marker 38.

While the invention has been described as being particularly adapted for use with a camera having a single shutter and diaphragm setting, it may be used with cameras having separate shutter and diaphragm setting mechanisms. This may be easily accomplished by correlating values in Tables 1 and 2 with the particular camera involved. Equally, other tables may be used where the camera lens has a higher or lower f/no. and a longer or shorter exposure time than those included in Table 2.

Although a preferred form of the invention has been described above, it should be pointed out that numerous modifications can be made without departing from the scope of the invention. For example, the scale markings 34 may be letters, in which case the exposure indexes may be numbers rather than as shown. Equally, dial scale plate 28 can be, in a less preferred form, a relatively rigid plate. In this case the detent 42 can be movable. Similarly, numerous modifications may be made in the relative positions of the marker 38, the holes 40, the detent 42 and the exposure indexes 36. Numerous other modifications based on the teachings in this application will be apparent to those skilled in the art.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

In a brightness meter comprising a housing having a front portion provided with a viewing aperture for observation into the interior of said housing, a pointer mounted within the housing for movement in response to the intensity of light adapted to be directed into the housing, and a dial scale plate, in the form of a relatively flat, circular member having sets of scale markings peripherally arranged around the front face thereof, mounted within said housing between said pointer and said viewing aperture for adjustment in a plane substantially parallel to the front of said housing and also parallel to a plane in which said pointer is movable whereby at least the indicating portion of the pointer and a peripheral portion of said dial scale plate are observable through said viewing aperture, in combination, a mounting member for said dial scale plate, the front portion of said housing being provided with an opening therein through which said mounting member extends and within which said mounting member is rotatably supported and said dial scale plate being provided with a centrally located opening engaged with said mounting member, means for effecting the rotation of said mounting member provided on the end thereof adjacent the outer face of said housing and adapted to be held in rotatable bearing engagement with the outer face of the front portion of said housing, fastening means fixedly securing said dial scale plate to said mounting member for rotation with the mounting member, and detent means carried by said housing within the interior thereof and releasably engageable with a portion of said dial scale plate located directly opposite the detent means, said detent means being adapted to restrain said dial scale plate against accidental rotative displacement from a position wherein a set of scale markings is in register with said viewing aperture and said detent means being released from said engagement by rotation of said plate upon the application of sufficient rotative force to said mounting member to overcome the holding action of said detent means.

MURRY N. FAIRBANK.
LOUIS ROSENBLUM.

REFERENCES CITED

The following references are of record in the file of this patent:

UNITED STATES PATENTS

| Number | Name | Date |
| --- | --- | --- |
| 2,157,660 | Fischer | May 9, 1939 |
| 2,247,763 | Meyers | July 1, 1941 |
| 2,353,163 | Keinath | July 11, 1944 |

FOREIGN PATENTS

| Number | Country | Date |
| --- | --- | --- |
| 458,695 | Great Britain | Dec. 24, 1936 |